United States Patent [19]

Okada

[11] 3,764,826

[45] Oct. 9, 1973

[54] TRANSISTOR CIRCUIT FOR COLOR TELEVISION RECEIVER

[75] Inventor: Takashi Okada, Kawasaki-shi, Kanagawa-ken, Japan

[73] Assignee: Sony Corporation, Tokyo, Japan

[22] Filed: Aug. 19, 1971

[21] Appl. No.: 173,221

Related U.S. Application Data

[63] Continuation-in-part of Ser. No. 89,159, Nov. 13, 1970, abandoned.

[30] Foreign Application Priority Data

Nov. 15, 1969 Japan ............................44/91529

[52] U.S. Cl. ..... 307/235 R, 178/5.4 MA, 330/30 D

[51] Int. Cl. .......................... H03k 5/20, H04n 9/52

[58] Field of Search .................. 307/235; 330/38 D; 178/5.4 MA

[56] References Cited

UNITED STATES PATENTS 3,586,766 6/1971 Heuer et al. .................... 330/154 X 3,619,486 11/1971 Tzakis .......................... 178/5.4 MA

*Primary Examiner*—John Zazworsky
*Attorney*—Lewis H. Eslinger et al.

[57] ABSTRACT

A transistor matrix circuit for a color television receiver which receives a luminance signal, and color difference signals, and provides color signals. The circuit is of a novel design using only transistors of one type thereby permitting the manufacture of the circuit in integrated circuit form. The circuit also includes adjustable circuit elements for independent control of the levels of each color signal and in which only the saturation degrees of the color signals are adjusted without changing their hues.

14 Claims, 6 Drawing Figures

INVENTOR.
TAKASHI OKADA
BY

INVENTOR
TAKASHI OKADA
BY

INVENTOR.
TAKASHI OKADA
BY
Lewis H Eslinger

INVENTOR.
TAKASHI OKADA
BY
Lewis H. Eslinger

TRANSISTOR CIRCUIT FOR COLOR TELEVISION RECEIVER

This application is a continuation-in-part of my copending application Ser. No. 89,159, filed on Nov. 13, 1970, now abandoned the disclosure of which is incorporated herein by reference.

This invention relates generally to color television receivers and particularly to transistor matrix circuits used in color television receivers.

A matrix circuit used in color television receivers is a circuit which receives a luminance signal as well as several color difference signals and provides at its output the color signals. In a typical three color system, there are three color difference signals (one for the red, green and blue information) and three output color signals, namely one for red, green and blue.

Heretofore, transistorized matrix circuits have been proposed which employ transistors of opposite conductivity types, namely NPN, PNP transistors. In one such circuit, an NPN transistor is connected in series with a PNP transistor with the emitters connected together. A luminance signal is applied to the base of one of the transistors and a single color difference signal is applied to the base of the other transistor. A color signal is provided in the collector of one of the two transistors. To make up a complete matrix circuit to handle the three colors, three transistors of one conductivity type for example, NPN are connected in series with a single PNP transistor. Each of the color difference signals are applied to a different base of an NPN transistor and the luminance signal is applied to the base of the PNP transistor. The color output signals are taken from the collectors of each of the NPN transistors. In circuits of this kind, however, there is the disadvantage that they do not lend themselves to manufacture by integrated circuit fabrication techniques. In particular, it is difficult and commercially impractical, to manufacture NPN and PNP transistors on the same integrated circuit chip. Therefore, the prior art transistor matrix circuit could not take advantage of integrated circuit manufacturing techniques.

The foregoing shortcomings of the prior art transistorized matrix circuits are avoided in the present invention by providing a novel circuit which employs only transistors of the same type and thus can be readily manufactured employing integrated circuit techniques. This produces both an economy in the cost of manufacture and assembly as well as the uniformity and precision of products that are not available with discrete component circuit manufacturing techniques.

An alternative embodiment of this invention includes a circuit in which the intensity of each of the color signals can be adjusted without affecting the intensity of the other color signals. This appears on a color picture as a variation or adjustment of the intensity of a particular hue and does not involve any change in the hue or the color. Put another way, the colors on the screen vary only in level and hence in saturation degree there is no corresponding change in hue.

One object of this invention is to provide a matrix circuit which is constructed with transistors of the same kind and hence is suitable for manufacture as an integrated circuit.

A further object of this invention is to provide a transistor matrix circuit for a color television receiver which may be easily constructed.

A further object of this invention is to provide a matrix circuit which is constructed with transistors of the same type which are capable of being formed on the same semiconductor substrate and hence suitable for integrated circuit manufacture.

Another object of the present invention is to provide a novel matrix circuit which is capable of excellent control of the color signal level.

A still further object of this invention is to provide a novel transistor matrix circuit having controls for independently adjusting the level of each color signal.

According to the invention there is provided a color television receiver transistor matrix circuit adapted to receive a luminance signal and at least one color difference signal and provide a color signal having first and second transistors of like type with first, second, and third terminals; means for connecting the first terminals to a power source; an impedance element connected between the second terminals; current source means connected between the end of the impedance element which is nearest the second transistor and a reference potential, for example, ground, for carrying a constant current which is composed of currents flowing in the impedance element and the second transistor, respectively; means for fixedly biasing the second transistor connected to the third terminal of the second transistor; means for applying a color difference signal to the third terminal of the first transistor, and a third transistor of the same type having first, second, and third terminals, the first terminal being connected to the other end of the impedance element, the second terminal being connected to a reference or ground potential, and the third terminal adapted to receive the luminance signal, and upon application a color signal is generated by the matrix circuit and means for receiving the color signal from one of the first terminals of the transistors.

The construction of illustrative embodiments as well as further objects and advantages thereof, will become apparent when read in conjunction with the accompanying drawings wherein.

Figure 1:
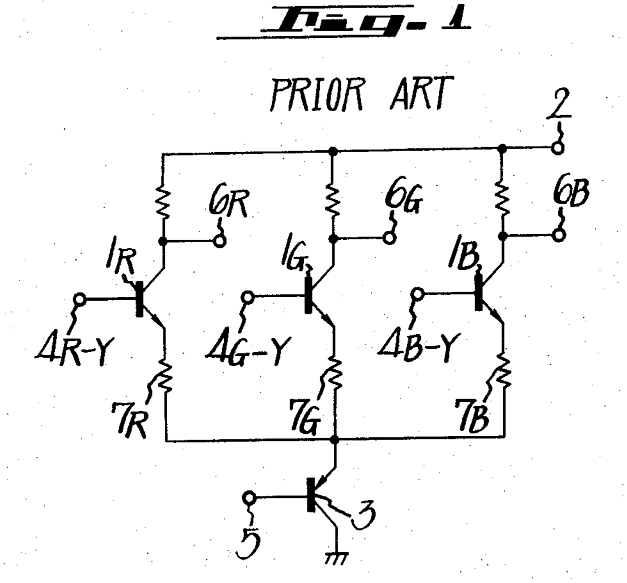
FIG. 1 PRIOR ART
FIG. 1 is a schematic circuit diagram of a prior art transistorized matrix circuit.

Referring now to FIG. 1 there is shown a schematic circuit diagram of a prior art transistorized matrix circuit. The circuit includes three NPN transistors, 1R, 1G and 1B having their collectors connected to a terminal 2 which is to be connected to a source of power. A transistor of opposite conductivity type, namely a PNP transistor 3, has its emitter connected to the emitters of the transistors 1R, 1G and 1B through resistors 7R, 7G, 7B respectively. The collector terminal of transistor 3 is grounded. The luminance signal is applied to the base of the transistor 3; and a different color difference signal is applied to each of the bases (shown here as 4R – Y, 4G – Y, 4B – Y) of the transistors 1R, 1G and 1B. The three color signals, red, green and blue, are provided on the collectors 6R, 6G and 6B of the transistors 1R, 1G, and 1B. The postscript R, G, and B stand for the colors red, green and blue, and the legends R, G and B is used to denote those portions of the circuit which are dedicated to providing the red, green and blue color signals. Thus, the red color difference signal is applied to terminal 4R – Y and the red color signal appears on the output terminal 6R. The green color difference signal is applied to the base 4G – Y and the green color signal is provided at the output terminal 6G. Finally, the blue color difference signal is applied to the base 4B – Y and the blue color signal is provided at the output terminal 6B.

The operation of the circuit may be traced as follows. Color difference signal currents of the color difference signals (R – Y, G – Y, and B – Y) flow in the NPN-type transistors 1R, 1G and 1B while being superimposed on a luminance signal current of the luminance signal (Y) thus deriving red, green, and blue color signals R, G and B at the output terminals 6R, 6G, and 6B. Such a prior art matrix circuit as shown in FIG. 1 employs the NPN-type transistors 1R, 1G and 1B and the PNP transistor 3 which is different in conductivity type therefrom, so that it is extremely difficult to construct the matrix circuit in the form of an integrated circuit. Namely, it is the practice in the art to form the NPN-type transistors 1R, 1G, and 1B on an N-type semiconductor substrate and the PNP-type transistor 3 on a P-type semiconductor substrate.

Figure 2:
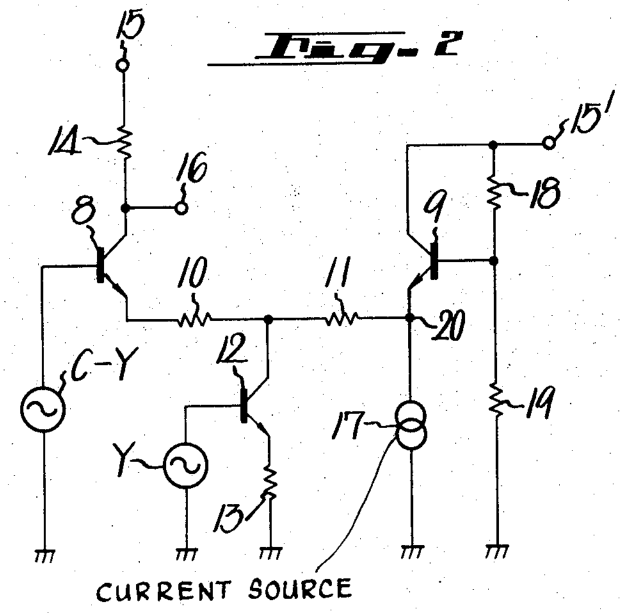
FIG. 2 is a schematic circuit diagram of a matrix circuit constructed in accordance with the invention.

Referring now to FIG. 2 there is shown a schematic circuit diagram of one channel of a matrix circuit constructed in accordance with the invention. A channel is dedicated to a particular color and one channel would receive one color difference signal and provide one color signal. In a three color television receiver there would be three circuits similar to the one shown in FIG. 2, with one circuit each for the red, green and blue color difference signals and red, green and blue color signals. A color difference signal is shown provided by a source C –Y, where C represents any color, and a luminance signal is shown provided by a source Y. The output from the circuit which is the color signal and is obtained at terminal 16. The circuit includes a pair of NPN transistors, 8 and 9, having their emitters connected together by resistors 10 and 11. The collectors of the transistors 8 and 9 are connected to terminals 15 and 15′ for connection to a source of power (not shown). A current limiting resistor 14 is included in the collector circuit of transistor 8. A bias circuit made up of resistors 18 and 19 is connected across the power connection 15′ and ground and with their common point to the base of transistor 9 to bias the transistor to operate in its linear region. The DC bias on the base electrode of the transistor 9 is chosen to be the same as the DC bias on transistor 8 which results from the bias potential of the color difference signal C–Y applied to the base of transistor 8. Transistor 8 has its base connected to receive the color difference signal shown here as coming from a source C–Y. A so called current source 17, that is, a device which passes a constant current, is connected between ground and the connection point 20 of the emitter of transistor 9 to one end of resistor 11 for carrying currents flowing in resistor 11 and transistor 9, respectively. A third NPN transistor 12 has a collector connected to the common point of the two resistors 10 and 11, and an emitter connected through a resistor 13 to ground. The base of this transistor 12 receives the luminance signal, shown here as coming from source Y.

The overall operation of this circuit is to take the color difference signal (C–Y) and the luminance signal (Y) and provide a color signal on output terminal 16 which is connected to the collector of transistor 8. The DC bias of the circuit, and the signal flow in the circuit can be traced as follows. The transistor 9 and the current source 17 connected to its emitter constitute a constant DC voltage source for the collector of transistor 12 through resistor 11. This is equivalent to a battery being connected to the collector of transistor 12 through resistor 11. So long as the transistor 9 is on, and the base potential of the transistor 9 is biased constant, then the emitter is at a constant potential due to the base potential. Accordingly, the connection point 20 of the transistor 9 and the current source 17 is held at a constant DC potential. Considering this in terms of the current flow, an increase in the current flowing into the current source 17 through the resistor 11 causes a decrease in the current flowing in the transistor 9, and a decrease in the current flowing through the resistor 11 causes an increase in the current flowing in the transistor 9.

With such an arrangement and the luminance signal Y and a color difference signal C – Y being respectively applied to the bases of the transistors 12 and 8; the luminance signal is applied through the resistors 10 and 11 to the emitters of transistors 8 and 9 respectively. Since the base bias DC potentials of the transistors 8 and 9 are held equal, the affect on the conductance of transistor 8 on the luminance signal level applied to the emitter of transistor 8 is dependent upon the resistance ratio of the resistors 10 and 11. The transistors 8, 9 and 12 form a differential amplifier, and the current of the color difference signal C – Y applied to the base of the transistor 8 flows into the current source 17 through the resistors 10 and 11.

The current source 17 is designed to flow or carry a current greater than a maximum value of $E_{C-Y}/(R_{10}+R_{11})$ when the color difference signal C – Y is zero. In this relation $E_{C-Y}$ is the voltage value of the color difference signal supplied to the base of the transistor 8; and $R_{10}$ and $R_{11}$ are the resistance values of the resistors 10 and 11 respectively. Thus, the color difference signal current of a maximum value flowing through the resistor 11 can be carried by the current source 17 without cutting off the transistor 9, irrespective of the level of the luminance signal Y supplied to the transistor 12 and irrespective of the luminance signal current flowing through the transistor 9, that is, even when the luminance signal current is zero. Thus, with this selection of circuit values, the color difference signal of the maximum possible value can be fed to the base of the transistor 8. The current source 17 may be constituted by any of the well known constant current sources, such as, a common base transistor or constant current sink transistor, or may be simply constituted by an impedance element, for example, a resistor or the like, which may well perform the function described above.

In this manner, the luminance signal current of the luminance signal Y and the color difference signal current of the color difference signal C – Y flow to the transistor 8 to provide at the collector of the transistor 8 a color signal C, which is derived from the output terminal 16. As noted above, a three color television receiver would employ three circuits of the kind illustrated in FIG. 2; each being supplied with red, green and blue color difference signals and the luminance signal, to obtain the red, green and blue color signals.

Figure 3:
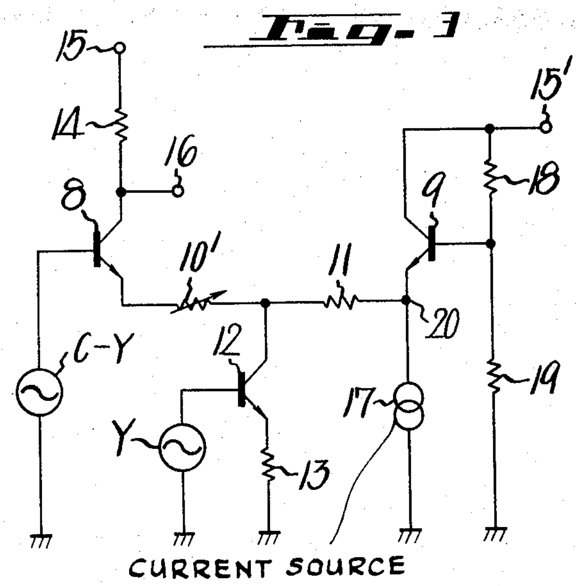
FIG. 3 is a schematic circuit diagram showing an alternative embodiment of a matrix circuit constructed in accordance with the invention.

FIG. 3 is a schematic circuit drawing of one channel of a matrix circuit. FIG. 3 is similar to FIG. 2 and like elements in both circuits bear like legends. A description of those circuit elements which are the same in both figures need not be repeated, reference being had to the description accompanying the previous figure for an explanation. The difference between FIG. 3 and FIG. 2 is the inclusion of a variable resistor 10′ in place of the fixed resistor 10 in FIG. 2. By adjustment of this variable resistor 10′, the levels of the luminance signal and the color difference signals can be adjusted simultaneously and, as a result, the saturation degrees of the color signals derived at the output terminals can be adjusted without changing their hues.

If the resistance values of the variable resistor 10′ and the resistor 11 are taken as $R_{10}$ and $R_{11}$ respectively; and the voltage of the color difference signal applied to the base of the transistor 8 is taken as $E_{C-Y}$; and the luminance signal current flowing in the transistor 12 is taken as $i_y$; then the output current $i_0$ is given by the following equation:

$$i_0 = [i_0]_{c-y} + [i_0]_y = [1/(R_{10} + R_{11})]\ (E_{c-y} + R_{10}\, i_y)$$

where $[i_0]_{c-y}$ is the color difference signal current and $[i_0]_y$ the luminance signal current flowing in the transistor 8.

If the resistance value of the variable resistor 10′ is adjusted to be $R_{10} + \Delta R_{10}$, the resulting output current $i_0'$ is given by the following equation:

$$i_0' = [i_0']_{c-y} + [i_0']_y$$
$$= [1/(R_{10} + \Delta R_{10} + R_{11})]\ E_{c-y} + [R_{10}/(R_{10} + \Delta R_{10} + R_{11})]\ i_y$$

where $[i_0']_{c-y}$ is the color difference signal current and $[i_0']_y$ the luminance signal current flowing in the transistor 8.

Consequently, the following equations are obtained:

$$[i_0']_{c-y}/[i_0]_{c-y} = (R_{10} + R_{11}/R_{10} + \Delta R_{10} + R_{11})$$
$$[i_0']_y/[i_0]_y = (R_{10} + R_{11})/(R_{10} + \Delta R_{10} + R_{11})$$

that is, $$[i_0']_{c-y}/[i_0]_{c-y} = [i_0']/[i_0]_y = i_0'/i_0 = (R_{10} + R_{11}/R_{10} + \Delta R_{10} + R_{11})$$

Accordingly, the luminance signal and the color difference signal are simultaneously adjusted at the same ratio by the adjustment of the variable resistor 10′ so that the color signals vary only in level and hence in saturation degree but does not change in hue.

Figure 4:
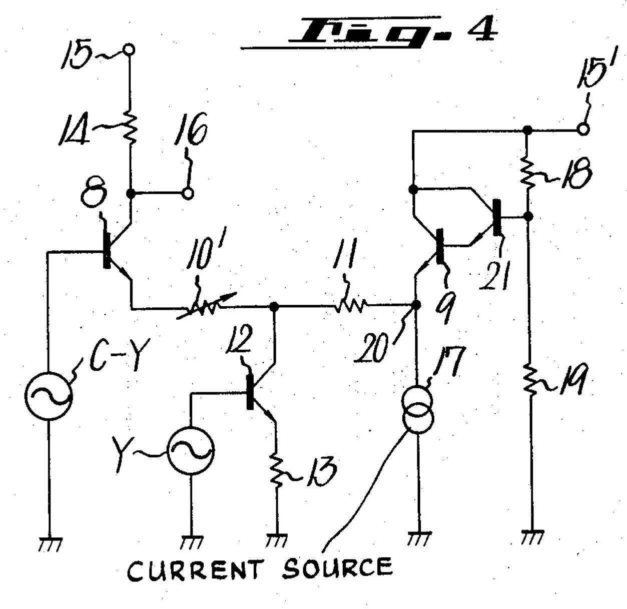
FIG. 4 is a schematic circuit diagram of a still further embodiment of the invention.

FIG. 4 is a schematic circuit diagram showing an alternative embodiment of the matrix circuit. FIG. 4 is similar to FIG. 3, and like element in both figures bear like legends. The description of this figure will not repeat a description of like elements, which have been described above in connection with FIGS. 2 and 3. FIG. 4 differs from FIG. 3 by the inclusion of a transistor 21 between transistor 9 and bias resistors 18 and 19. It will be appreciated that transistors 9 and 21 form a Darlington connection lowering the impedance path of the luminance signal and thereby improving the high frequency characteristics of the circuit. In the foregoing description, the luminance signal Y and the color difference signal C−Y are respectively applied to the bases of the transistors 12 and 8, however, it should be understood that it is also possible to apply the luminance signal Y and color difference signal C−Y respectively to the bases of the transistor 8 and 12.

Figure 5:
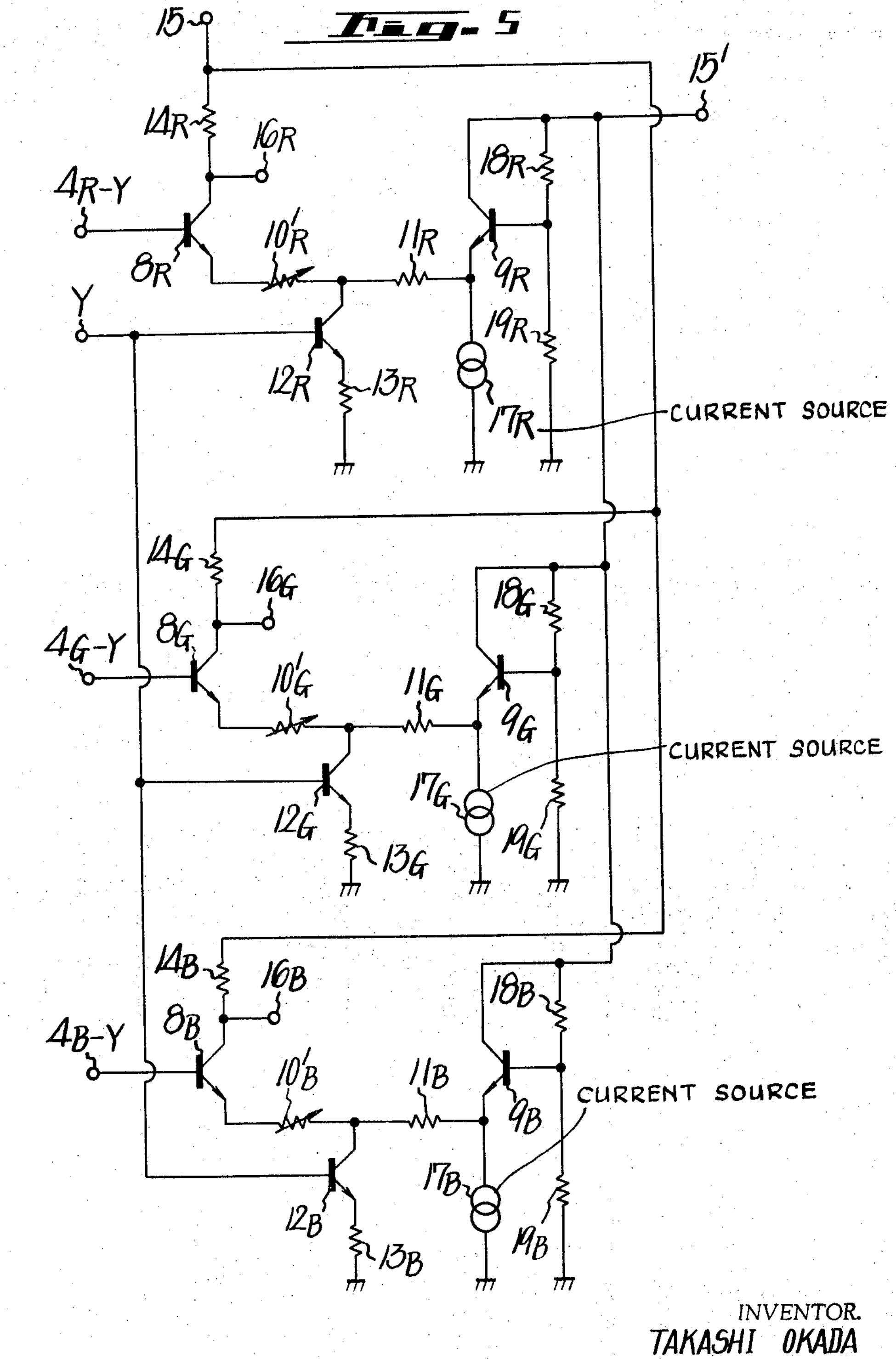
FIG. 5 is a schematic circuit diagram illustrating an arrangement of a complete matrix circuit constructed in accordance with the invention.

FIG. 5 is a schematic circuit diagram of a complete matrix circuit for handling three color difference signals and providing three color signals. The red color difference signal is provided on a terminal 4R−Y, the green color difference signal is provided on a terminal 4G−Y, and the blue color difference signal is applied to a terminal 4B−Y. The luminance signal is applied to a terminal Y. The output red color signal appears on a terminal 16R, the output green color signal is on terminal 16G, and the output blue color signal appears on a signal 16B. It will be appreciated that the matrix circuit of this figure has three subcircuits one dedicated to the color red, blue and green, and that each of the circuits are similar to the circuit shown in FIG. 3. The legend scheme of these circuits in FIG. 5 agree with the legends used in FIG. 3 except that a postscript R, G or B identifies which elements are dedicated to the red, green and blue color signals. A single power connection 15 and 15′ is provided for all three subcircuits. The operation of the three subcircuits, and the overall matrix circuit, is the same as described above in connection with FIG. 3. It will be noted that in the circuit of FIG. 5 the levels of the color signals R, G, and B can be adjusted independently by varying the resistors 10′R, 10′G and 10′B. Thus, the circuit of this figure has a merit of faithful color reproduction coupled with simultaneous level adjustment of the luminance signal and color difference signal at the same ratio.

Figure 6:
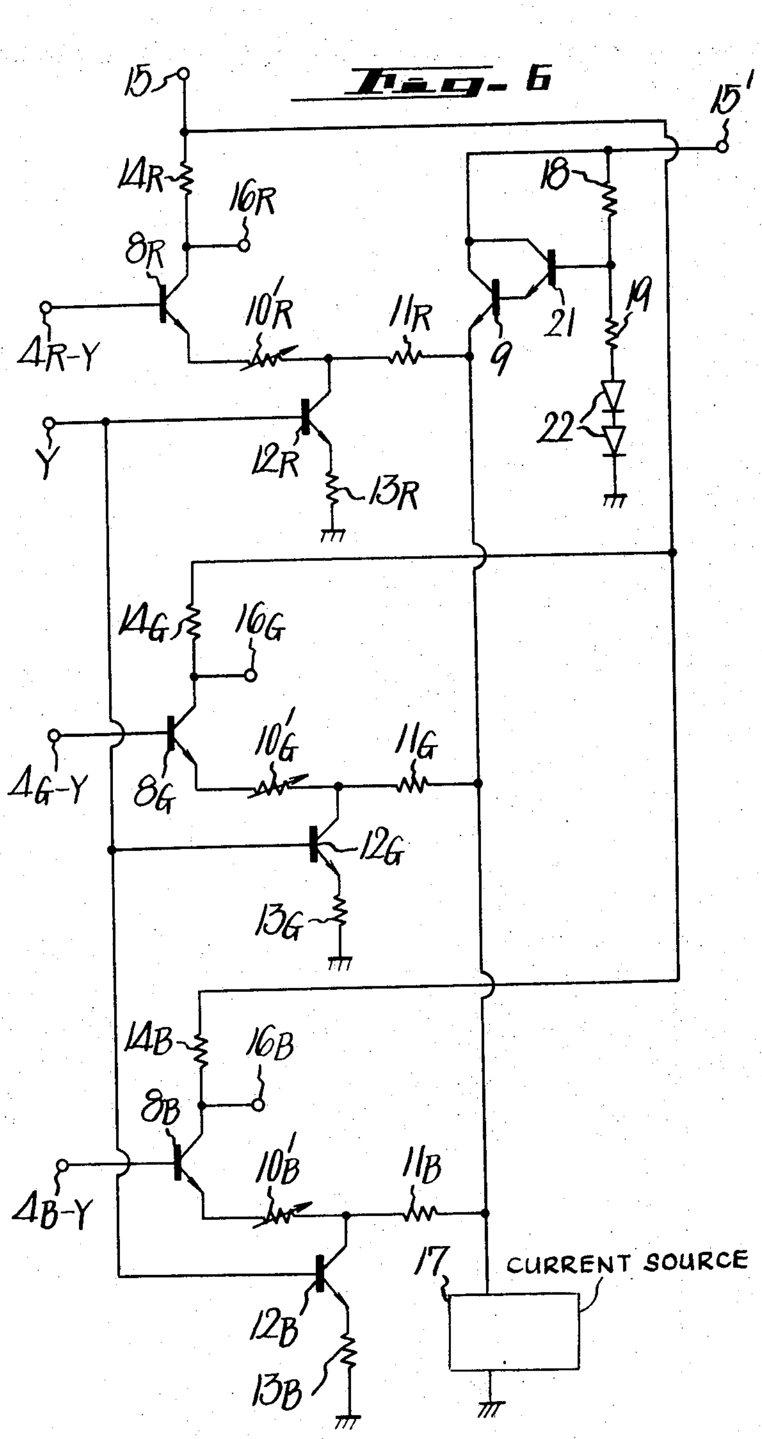
FIG. 6 is a schematic circuit diagram of another embodiment of the matrix circuit of the invention.

FIG. 6 is a schematic circuit diagram of an alternative embodiment of a three color matrix circuit. Like elements in FIG. 6 and the preceding FIG. 5 bear like legends. Reference should be made to the previous figures for an explanation of these elements. A difference between this figure and the previous one is the combining of transistors 9R, 9G and 9B with the current sources 17R, 17G and 17B respectively of the previous figure. As shown in FIG. 6 there is a single current source 17 connected to the emitter of an NPN transistor 9. Transistor 9 is connected with transistor 21 in a Darlington configuration (as described above in connection with FIG. 4), although a single transistor might be used here instead of the Darlington configuration. The common point between the emitter of transistor 9 and the current source 17 is connected to one end of the impedance elements 11R, 11G, and 11B. Thus, a common current source, and common transistors 9 and 21 are used for all three red, green and blue subcircuits. Diodes 22 are connected between ground and bias resistor 19 for stabilizing the bias voltage.

The present invention has been described employing NPN transistors. It will be readily appreciated by those skilled in the art that the circuit may be constructed employing PNP type transistors. Thus, there has been shown a transistor matrix circuit for use in a color television receiver which employs in its manufacture transistors of only one type (e.g. NPN) and which therefore, may be easily manufactured by integrated circuit techniques. The circuit, moreover, may include adjustable components by which each color signal may be adjusted without interfering with the other color signals.

The above description of the invention is intended to be illustrative only, and various changes and modifications in the embodiments described may occur to those skilled in the art. These changes may be made without departing from the scope of the invention, and thus it should be apparent that the invention is not limited to the specific embodiments described or illustrated in the drawings.

What I claim is:

1. A color television receiver transistor matrix circuit adapted to receive luminance and color difference input signals having a predetermined bias potential and to provide a color input signal, said matrix circuit comprising:

first and second transistors of like type each having first, second and third terminals;

means for connecting said first terminals of said first and second transistors to a power source;

an impedance element connected between said second terminals of said first and second transistors;

current source means connected between one end of said impedance element nearest said second transistor and a reference potential different from the potential of said power source for carrying currents flowing in said impedance element and second transistor, respectively;

means connected to said third terminal of the second transistor for fixedly biasing said second transistor;

means for applying one of said input signals to said third terminal of the first transistor so that the latter is biased by said predetermined bias potential of said one input signal;

a third transistor of the same type as said first and second transistors and having first, second and third terminals, said first terminal of said third transistor being connected to the other end of said impedance element, said second terminal of said third transistor being connected to a reference potential, and said third terminal of said third transistor being adapted to receive the other of said input signals;

and an output terminal for the color signal generated in said circuit and being connected to said first terminal of one of said transistors.

2. A transistor matrix circuit according to claim 1 wherein a further impedance element is connected between the second terminal of said first transistor and said other end of said impedance element.

3. A transistor matrix circuit according to claim 2 wherein said further impedance element is variable and adapted to be manually adjusted to control the amplitude of the color signal.

4. A transistor matrix circuit according to claim 1 wherein said output color signal is provided at the first terminal of the first transistor.

5. A transistor matrix circuit according to claim 1 wherein the means for biasing said second transistor biases the latter to the same extent as said predetermined bias potential of said one input signal biases said first transistor.

6. A transistor matrix circuit according to claim 1 wherein said current source means is adapted to carry currents whose amplitude is larger than the maximum current which passes through said impedance element as a result of said one input signal being applied to the third terminal of said first transistor, whereby cutting off of said second transistor is avoided.

7. A transistor matrix circuit according to claim 1, wherein said first, second and third terminals are respectively the collector, emitter, and base of the respective transistor.

8. A transistor matrix circuit according to claim 3, wherein a fourth transistor of the same type as said first, second and third transistors, is interconnected to said second transistor and said bias means in a Darlington configuration.

9. A color television receiver transistor matrix circuit adapted to receive two kinds of input signals respectively consisting of a luminance input signal and three different color difference input signals, and to provide three color output signals, said matrix circuit comprising:

first, second and third transistors of like type, each having first, second and third terminals;

means for connecting said first terminals of said transistors to a power source;

first, second and third impedance elements respectively connected, at one end, to said second terminals of said first, second and third transistors;

means connected to the other ends of said impedance elements for carrying currents passing through the latter and for maintaining a substantially constant potential at said other ends of the impedance elements;

means for applying one of said kinds of input signals to said third terminals of said first, second and third transistors, respectively; and fourth, fifth and sixth transistors of the same type as said first, second and third transistors and each having first, second and third terminals, said first terminals of said fourth, fifth and sixth transistors being connected to said one end of said first, second and third impedance elements, respectively, said second terminals of said fourth, fifth and sixth transistors being connected to a reference potential, and said third terminals of said fourth, fifth and sixth transistors being adapted to receive the other of said two kinds of input signals.

10. A transistor matrix circuit according to claim 9 wherein three further impedance elements are connected one each between the second terminal of a respective one of said first, second and third transistors and said one end of the respective one of said first, second and third impedance elements.

11. A transistor matrix circuit according to claim 10 wherein each of said further impedance elements is variable and adapted to be manually adjusted to control the amplitude of the respective color signal.

12. A transistor matrix circuit according to claim 9 wherein said means connected to the other end of each of said impedance elements includes a seventh transistor having three terminals; one terminal of said seventh transistor being connected to said power source; a constant current source connected to the second terminal of said seventh transistor and to said other end of each of said impedance elements; and fixed bias means connected to the third terminal of said seventh transistor.

13. A transistor matrix circuit according to claim 12 wherein a further transistor is interconnected with said seventh transistor and said fixed bias means in a Darlington configuration.

14. A transistor matrix circuit according to claim 9 wherein said means connected to the other ends of said impedance elements includes seventh, eighth and ninth transistors of the same type as said first, second and third transistors and each having first, second and third terminals, the first terminal of each of said seventh, eighth and ninth transistors being connected to said power source, said second terminal of each of said seventh, eighth, and ninth transistors being connected to said other ends of said first, second and third impedance elements, respectively, current source means connected to said second terminals of said seventh, eighth and ninth transistors, and fixed bias means connected to said third terminals of said seventh, eighth and ninth transistors.

* * * * *